(12) United States Patent
Watanabe et al.

(10) Patent No.: US 9,083,891 B2
(45) Date of Patent: Jul. 14, 2015

(54) VIDEO MONITORING APPARATUS

(75) Inventors: Yuki Watanabe, Kodaira (JP); Tsuneya Kurihara, Tokyo (JP); Naoto Akira, Tokyo (JP); Daisuke Matsubara, Koganei (JP); Atsushi Hiroike, Kawagoe (JP)

(73) Assignee: Hitachi, Ltd., Tokyo (JP)

( * ) Notice: Subject to any disclaimer, the term of this patent is extended or adjusted under 35 U.S.C. 154(b) by 249 days.

(21) Appl. No.: 13/882,673

(22) PCT Filed: Oct. 31, 2011

(86) PCT No.: PCT/JP2011/075053
§ 371 (c)(1),
(2), (4) Date: Apr. 30, 2013

(87) PCT Pub. No.: WO2012/081319
PCT Pub. Date: Jun. 21, 2012

(65) Prior Publication Data
US 2013/0250111 A1    Sep. 26, 2013

(51) Int. Cl.
*H04N 7/18* (2006.01)
*H04N 5/262* (2006.01)
*H04N 5/232* (2006.01)

(52) U.S. Cl.
CPC ......... *H04N 5/2621* (2013.01); *H04N 5/23293* (2013.01); *H04N 7/183* (2013.01)

(58) Field of Classification Search
CPC ......... H04N 7/18; H04N 7/181; H04N 7/183; H04N 5/2621; H04N 5/23293; H04N 5/23203; H04N 5/2259; H04N 5/232; H04N 2101/00; H04N 2201/0084; H04N 17/00; H04N 17/002

USPC ............... 348/148, 143, 151, 158, 46, 49, 50, 348/180, 187, 552, 240.99, 211.9, 222.1, 348/231.3, 239, 207.99
IPC ............. H04N 5/262,13/02, 7/18, 17/00, 5/225, H04N 5/232, 5/76, 5/228
See application file for complete search history.

(56) References Cited

U.S. PATENT DOCUMENTS 6,020,891 A    2/2000  Rekimoto
6,031,545 A    2/2000  Ellenby et al.
(Continued)

FOREIGN PATENT DOCUMENTS

JP    10-136345 A    5/1998
JP    10-336503 A    12/1998
(Continued)

OTHER PUBLICATIONS

Corresponding International Search Report with English Translation dated Feb. 7, 2012 (two (2) pages).
(Continued)

*Primary Examiner* — Sherrie Hsia
(74) *Attorney, Agent, or Firm* — Crowell & Moring LLP

(57) ABSTRACT

A video monitoring apparatus capable of efficiently superimposing additional information on a monitoring camera image is provided. The video monitoring apparatus holds image specifying information for specifying an image picked up by a camera and additional information in correspondence with each other. In superimposing additional information on an image, additional information corresponding to images having a distance therebetween falling within a prescribed range is searched for, and out of the thus found additional information, one that may be fit within an image currently picked up by the camera is superimposed on the camera image.

13 Claims, 14 Drawing Sheets

(56) References Cited

U.S. PATENT DOCUMENTS

| | | | |
|---|---|---|---|
| 6,037,936 | A | 3/2000 | Ellenby et al. |
| 6,389,182 | B1 | 5/2002 | Ihara et al. |
| 6,414,696 | B1 | 7/2002 | Ellenby et al. |
| 6,654,060 | B1 | 11/2003 | Kurosawa et al. |
| 2007/0279493 | A1* | 12/2007 | Edanami ........................ 348/148 |

FOREIGN PATENT DOCUMENTS

| | | |
|---|---|---|
| JP | 3558104 B2 | 5/2004 |
| JP | 2005-175712 A | 6/2005 |
| JP | 2005-354461 A | 12/2005 |
| JP | 3786166 B2 | 3/2006 |
| JP | 2007-67975 A | 3/2007 |
| JP | 4294093 B2 | 4/2009 |

OTHER PUBLICATIONS

Georg Klein et al., "Parallel Tracking and Mapping for Small AR Workspaces", In Proc., Sixth IEEE and ACM Int'l Symp., Mixed and Augmented Reality, 2007, (ten (10) pages).

* cited by examiner

FIG. 2

| MESSAGE ID 201 | MESSAGE 202 | TIME 203 | PAN 204 | TILT 205 | ZOOM 206 | CAMERA IMAGE 207 | IMAGE FEATURE 208 |
|---|---|---|---|---|---|---|---|
| 1 | message1 | 2010/09/01 1:23:25 | -15.0 | -10.0 | 1.5 | | [238, 119, 140, 109, 197, ....] |
| 2 | message2 | 2010/09/06 3:38:51 | 0.0 | 0.0 | 1.0 | | [138, 92, 161, 50, 162, ....] |
| ... | ... | ... | ... | ... | ... | ... | ... |

109

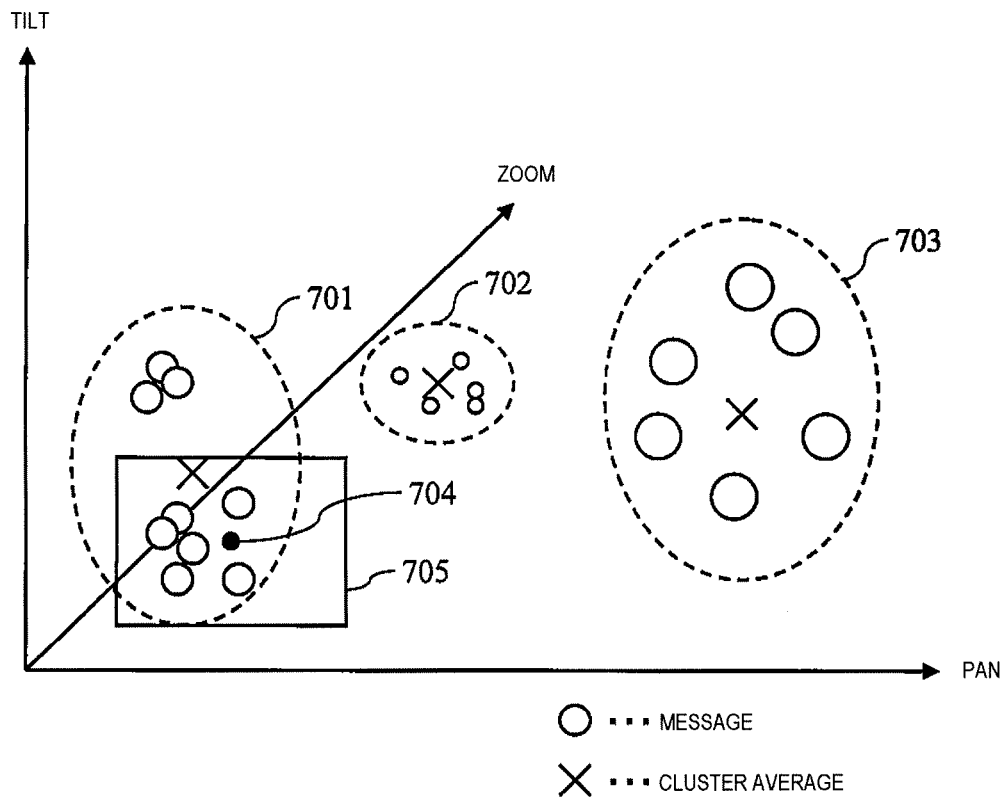

FIG. 13
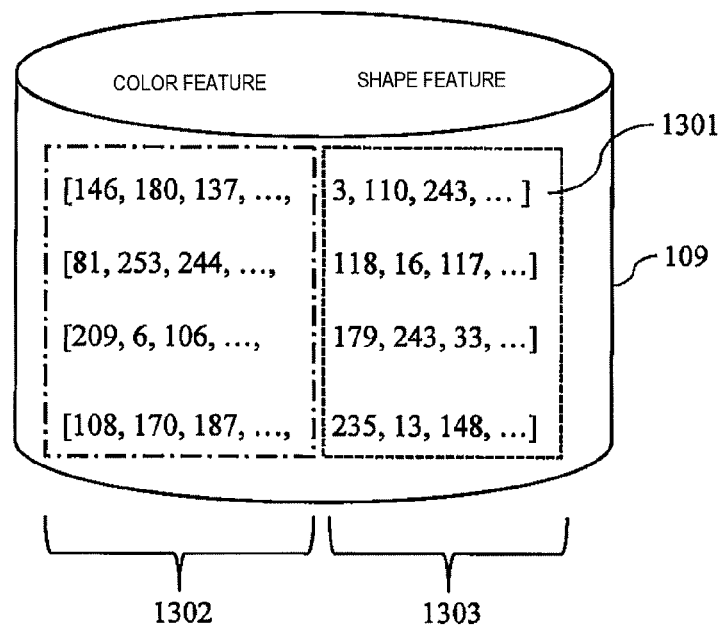
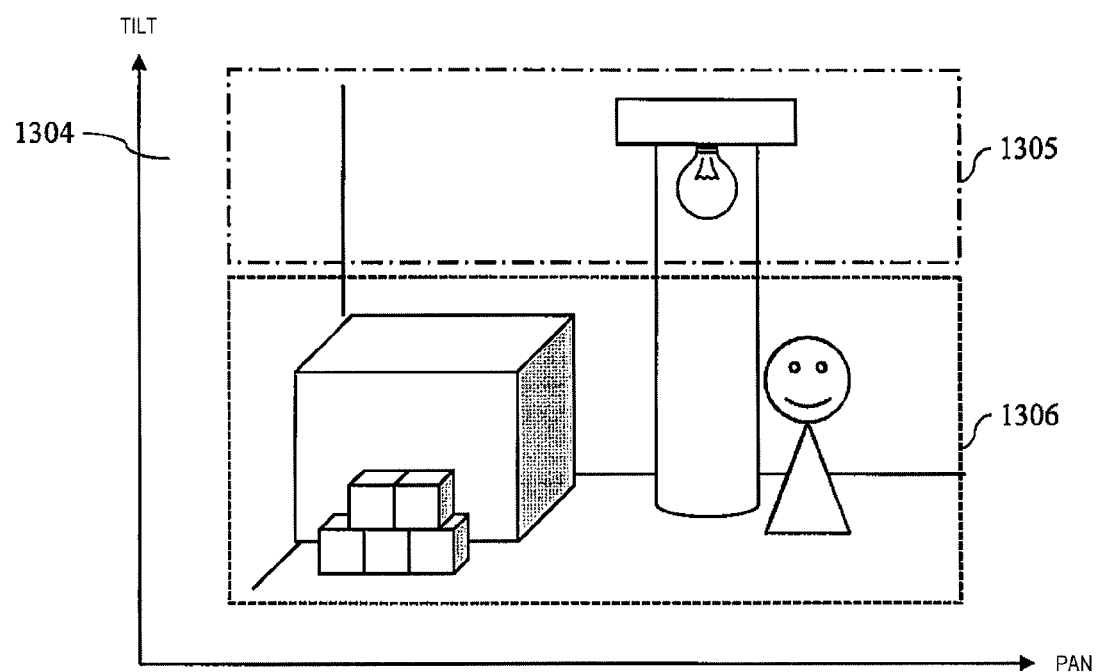

VIDEO MONITORING APPARATUS

This application claims the priority of Japanese application 2010-279537, filed Dec. 15, 2010, which was filed as International Application No. PCT/JP2011/075053, on Oct. 31, 2011, the disclosures of which are expressly incorporated by reference herein.

TECHNICAL FIELD

The present invention relates to a video monitoring apparatus.

BACKGROUND ART

In conducting a monitoring operation by using images, additional information (a text, an image, a voice or the like) is sometimes superimposed on a monitoring camera image for realizing an efficient monitoring operation. In, for example, a maintenance/management operation for a plant, information is desired to be superimposed on a monitoring camera image so that instructions for work procedures or things to note can be smoothly checked.

In the case where information is superimposedly displayed on a monitoring camera image, it is necessary to display the information in an appropriate position in a screen in accordance with use of the information. Accordingly, it is necessary to specify what kind of video is currently displayed in a screen. As a method for specifying a current video, a sensor-based positioning method in which various sensors (such as a magnetic sensor, a gyro sensor, an infrared sensor and a GPS) are used for obtaining the position and the attitude of a camera is known.

PTL 1 mentioned below describes a graphic user interface generating apparatus that changes the content or shape of information displayed in a display field region by using attitude determining means for determining the attitude of a camera by using a compass and position determining means for determining the position of the camera on the basis of the latitude and the longitude of the camera. When this technique is employed, information of a message and the like may be made to correspond to a position on an arbitrary real space, so as to be displayed in a display device.

PTL 2 mentioned below describes a method for generating a synthetic image, in which a three-dimensional virtual matter is superimposed on a camera image, on the basis of a three-dimensional space coordinate calculated by using magnetic field generating means and magnetic field detecting means.

On the other hand, a vision-based positioning method for obtaining the position and the attitude of a camera by analyzing a video obtained from the camera without using sensor information is known. As an example of the vision-based positioning method, a method using a marker of a specific pattern whose image can be easily recognized is known.

PTL 3 mentioned below describes a method for recognizing a given image pattern so as to draw information in accordance with the image pattern to be superimposed on an image obtained from a camera.

NPL 1 mentioned below describes a method for superimposing information on a camera image by estimating the position and the attitude of a camera without using a specific marker but using a characteristic point or line detected in an image obtained from the camera.

In these methods, the attitude and the position of a camera are determined on the assumption that the installation position of the camera is changed. If the camera is fixed however, a simpler method may be employed.

PTL 4 mentioned below describes a method for determining a position for displaying additional information on a camera image on the basis of information on the angle of a camera mount and a zoom operation. In this document, an arrangement position of an outer frame of explanatory characters to be superimposed is found so that the sum of luminance differences among pixels adjacent to one another in a region surrounded by the outer frame of the explanatory characters may be minimized, so as to prevent a subject to be picked up by the camera from overlapping the explanatory characters.

PTL 5 mentioned below describes a method for displaying a synthetic image by using camera control information. In this document, it is determined in accordance with a zoom magnification whether or not additional information is displayed.

CITATION LIST

Patent Literature

PTL 1: Japanese Patent No. 4294093
PTL 2: Japanese Patent No. 3558104
PTL 3: Japanese Patent No. 3786166
PTL 4: JP-A-2005-354461
PTL 5: JP-A-H10-336503

Non-Patent Literature

NPL 1: G. Klein and D. Murray, Parallel tracking and mapping for small AR workspaces, In Proc. Sixth IEEE and ACM Int'l Symp. Mixed and Augmented Reality, 2007

SUMMARY OF INVENTION

Technical Problem

In the conventional techniques described in the aforementioned documents, there is possibility that a large amount of additional information may be registered for a monitoring camera image picked up in one place. In this case, a load of processing for selecting information to be superimposedly displayed from the large amount of additional information is so large, which increases the load of an apparatus.

The present invention was achieved for solving such a problem, and an object of the invention is to provide a video monitoring apparatus capable of efficiently superimposing additional information on a monitoring camera image.

Solution to Problem

In the video monitoring apparatus of the present invention, image specifying information for specifying an image picked up by a camera and additional information are held in association with each other. In superimposing additional information on an image, additional information corresponding to images having a distance therebetween within a prescribed range are searched for, and out of the thus found additional information, additional information that may be fit within an image currently picked up by the camera is superimposed on the camera image.

Advantageous Effects

According to the video monitoring apparatus of the present invention, additional information corresponding to images having a distance therebetween within a prescribed range are first searched for, and therefore, additional information used as candidates for superimposed displaying may be limited. Accordingly, there is no need to make determination on all additional information for whether or not it is necessary to be superimposedly displayed, and as a result, the load of the processing can be reduced.

BRIEF DESCRIPTION OF DRAWINGS

FIG. 2 is a diagram illustrating the structure of a database 109 and exemplary data.

FIG. 7 is a diagram illustrating a concept of clustering processing for messages in accordance with pan, tilt and zoom values.

FIG. 8 is a diagram illustrating the structure of cluster information and exemplary data.

FIG. 13 is a diagram illustrating image feature information 1301 stored in the database 109 of Embodiment 4 and a state where a degree of similarity between images is calculated by using the information.

DESCRIPTION OF EMBODIMENTS

Embodiment 1

Figure 1:
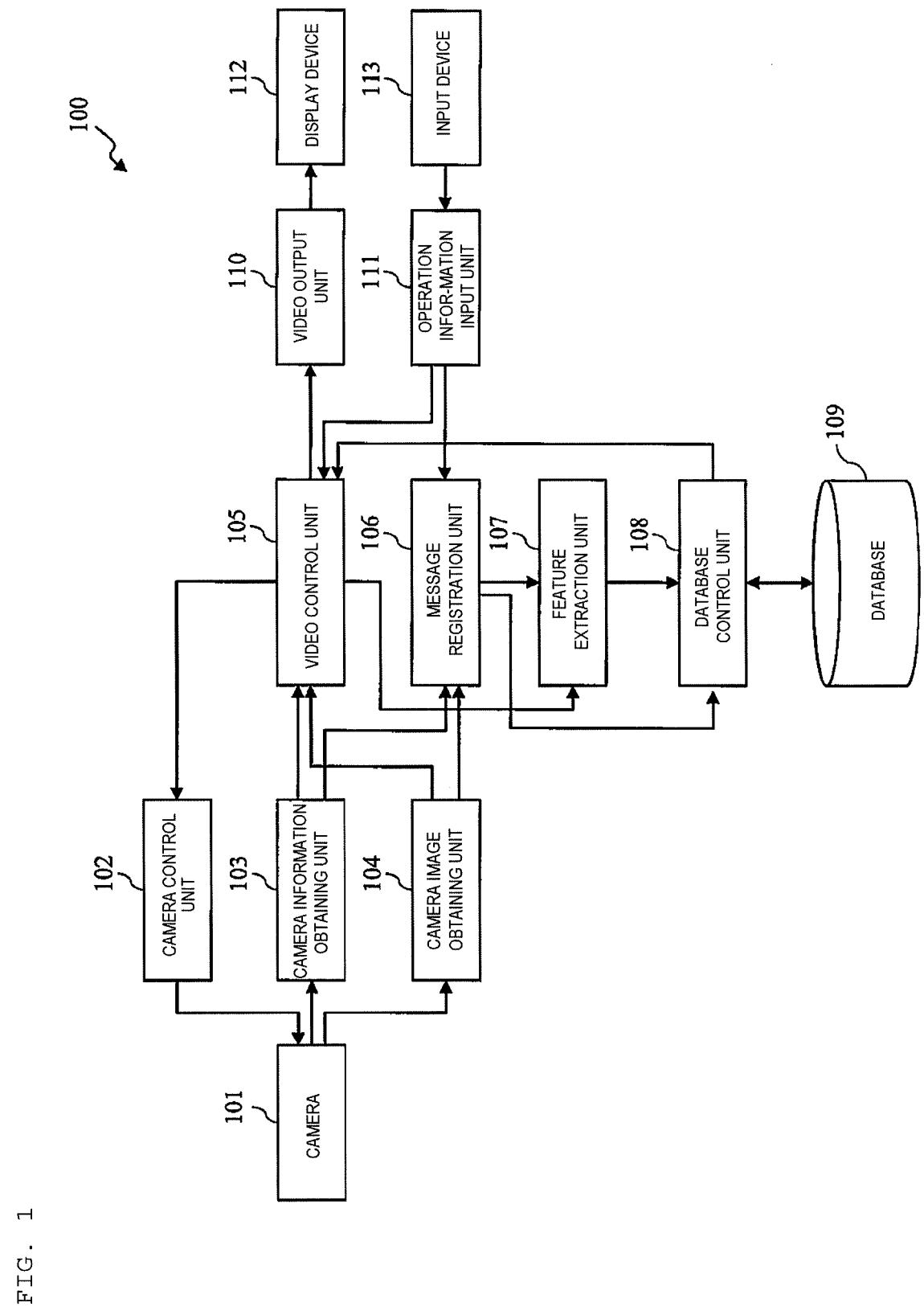
FIG. 1 is a functional block diagram of a video monitoring apparatus 100 according to Embodiment 1.

FIG. 1 is a functional block diagram of a video monitoring apparatus 100 according to Embodiment 1 of the invention. The video monitoring apparatus 100 is an apparatus for displaying additional information such as a text and an image superimposedly on a monitor video. Herein, description will be made on the assumption that the additional information is text data, but the other type of additional information may be used. Herein, terms of "video" and "image" will be used in substantially the same meaning unless they are particularly distinguished from each other.

The video monitoring apparatus 100 includes a camera 101, a camera control unit 102, a camera information obtaining unit 103, a camera image obtaining unit 104, a video control unit 105, a message registration unit 106, a feature extraction unit 107, a database control unit 108, a database 109, a video output unit 110, an operation information input unit 111, a display device 112 and an input device 113.

The camera 101 is a device for picking up monitor images, and includes a driver device for changing its imaging visual field. The driver device can change imaging parameters such as pan, tilt and zoom. The camera 101 receives a control signal from the outside so as to change the imaging parameters (pan, tilt and zoom values) in accordance with the control signal. Furthermore, it can inform the outside of currently set imaging parameters. A commercially available surveillance camera or the like may be used as the camera 101.

The camera control unit 102 sends a control signal for changing the pan, tilt and zoom of the camera 101 to the camera 101. The camera control unit 102 may be constructed so as to absorb a difference in communication protocol between different types of the camera 101 for sending a control signal in accordance with the specifications of the camera 101.

The camera information obtaining unit 103 sends, to the camera 101, a request to obtain the state (the pan, tilt and zoom values) of the driver device of the camera 101 and outputs the obtained information to the video control unit 105 and the message registration unit 106.

The camera image obtaining unit 104 obtains a video (a still image) picked up by the camera 101 and outputs the obtained video to the video control unit 105 and the message registration unit 106.

The video control unit 105 receives, from the operation information input unit 111, an operation instruction to the system issued by a user, and issues a control instruction for the pan, tilt and zoom to the camera control unit 102 in accordance with the current state (the pan, tilt and zoom values) of the driver device of the camera 101 received from the camera information obtaining unit 103. Furthermore, the video control unit 105 obtains a camera image from the camera image obtaining unit 104, obtains a text message registered in the database 109 from the database control unit 108, and superimposes the text message on the camera image so as to output the resultant image to the video output unit 110. Besides, in obtaining a text message from the database control unit 108, the video control unit 105 outputs the camera image to the feature extraction unit 107, so as to limit text messages by using, as a condition, an image feature of the camera image calculated by the feature extraction unit 107.

The message registration unit 106 receives, from the operation information input unit 111, a text message to be registered in the database 109 and position information of the text message on a monitoring screen. The message registration unit 106 calculates, by using the pan, tilt and zoom values of the camera 101 obtained from the camera information obtaining unit 103 and the position information of the text message on the monitoring screen, pan, tilt and zoom values to be used for displaying the text message in the center of the monitoring screen, and outputs the calculated values to the database control unit 108 together with the camera image obtained from the camera image obtaining unit 104. Furthermore, the message registration unit 106 outputs the camera image to the feature extraction unit 107 for calculating an image feature.

The feature extraction unit 107 calculates an image feature of a camera image sent from the video control unit 105 or the message registration unit 106, and outputs the calculated image feature to the database control unit 108.

The database control unit 108 registers, in the database 109, a message, a camera image, and pan, tilt and zoom values sent from the message registration unit 106, an image feature of the camera image calculated by the feature extraction unit 107 and biographic information such as registration time in association with one another. In registering these information in the database 109, the database control unit 108 performs clustering processing for the data in accordance with the pan, tilt and zoom values. The clustering processing will be described later with reference to FIG. 5. Besides, the database control unit 108 reads a text message satisfying a condition from the database 109 in response to a request issued by the video control unit 105. The condition includes, for example, the pan, tilt and zoom values, time and a degree of similarity in the image feature.

The database 109 stores information such as a text message, a camera image, pan, tilt and zoom values, an image feature and time in association with one another. The database 109 is constructed by, for example, storing these data in a storage device such as a hard disk or a semiconductor memory. The details of the database 109 will be described later with reference to FIG. 3.

The video output unit 110 outputs a monitor image generated by the video control unit 105 to the display device 112.

The operation information input unit 111 outputs an operation instruction input by a user through the input device 113 to the video control unit 105 or the message registration unit 106.

The display device 112 is a display device having a display screen part such as a liquid crystal display, and displays a monitor image received from the video output unit 110 on the screen.

The input device 113 is an input interface for transferring a user operation to the system, such as a mouse, a keyboard or a touch device.

FIG. 2 is a diagram illustrating the structure of the database 109 and exemplary data. Herein, an exemplary structure in a table form is described, but arbitrary data format may be used.

The database 109 includes a message ID field 201, a message field 202, a time field 203, a pan field 204, a tilt field 205, a zoom field 206, a camera image field 207 and an image feature field 208.

The message ID field 201 holds an identification number of each text message. The message field 202 holds a message input by a user to be superimposedly displayed on a monitor image. As for a text message, for example, a character string of the message is held. The time field 203 holds time and date of registration of a message correspondingly held in the message field 202 in the database 109.

The pan field 204, the tilt field 205 and the zoom field 206 respectively hold pan, tilt and zoom values of the camera 101 to be employed for displaying a message correspondingly held in the message field 202 in the center of the monitoring screen of the display device 112. The parameters held in these fields have meaning as image specifying information to be employed for specifying an image to be picked up by the camera 101 by specifying the imaging visual field of the camera 101 with these parameters. A parameter other than these values, such as a geographic position or an installation angle of the camera 101 may be used as the image specifying information.

The camera image field 207 holds a still image (binary data) of a camera image used in displaying a message correspondingly held in the message field 202 in the center of the monitoring screen. The image feature field 208 holds an image feature extracted from a camera image correspondingly held in the camera image field 207. The image feature is numerical data obtained from a feature of an image itself, such as a color feature or a shape feature, and is expressed as vector data with a fixed length.

If the position of a message on the screen is to be specified, a coordinate field for describing a position on the screen may be provided in addition to the respective fields illustrated in FIG. 2. If a position on the screen is not specified, a message may be displayed in a fixed position such as the center of the screen.

Figure 3:
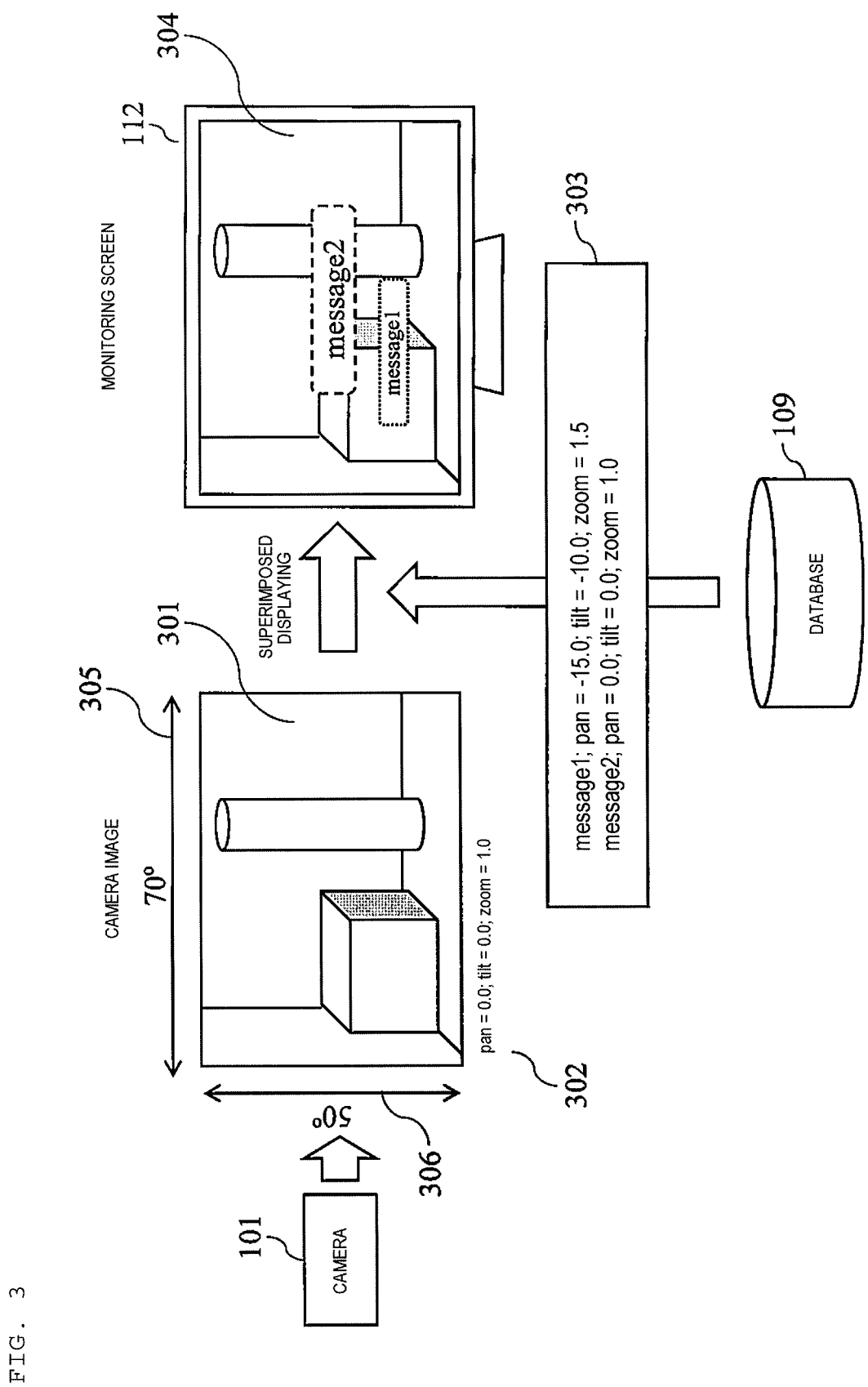
FIG. 3 is a diagram illustrating a state where a video control unit 105 superimposes a message on a camera image.

FIG. 3 is a diagram illustrating a state where the video control unit 105 superimposes a message on a camera image. The video control unit 105 draws a message 303 registered in the database 109 superimposedly on a camera image 301 obtained from the camera 101 so as to display the resultant image in the display device 112 as a monitoring screen 304. In this manner, a message can be superimposedly displayed on a camera image in the monitoring screen 304.

The video control unit 105 calculates a position for displaying the message 303 on the basis of the state (the pan, tilt and zoom values) 302 of the driver device of the camera 101, pan, tilt and zoom values in association with the message 303, and a horizontal angle of view 305 and a vertical angle of view 306, that is, the specifications of the camera 101.

In the exemplary case illustrated in FIG. 3, the horizontal angle of view 305 is 70° and the vertical angle of view 306 is 50° when the zoom value of the camera 101 is 1.0. Since the pan and tilt values of the camera 101 are 0.0 and 0.0, respectively, a message to be superimposedly displayed should satisfy a condition that it has an associated pan value of −35.0 to 35.0 and an associated tilt value of −25.0 to 25.0. The video control unit 105 searches for text messages satisfying this condition in the database 109.

"Message 2" is displayed in the center of the screen because it has an associated pan value of 0.0 and an associated tilt value of 0.0. "Message 1" is displayed in a lower left portion in the screen because it has an associated pan value of −15.0 and an associated tilt value of −10.0. The message 303 may be displayed simply as a character string itself or may be displayed to be surrounded by a box or a balloon for putting a message therein. Furthermore, the display size of a message may be changed in accordance with its zoom value, in such a manner that, for example, "message 1" registered in association with a zoom value of 1.5 is displayed to be smaller than "message 2" registered in association with a zoom value of 1.0.

Figure 4:
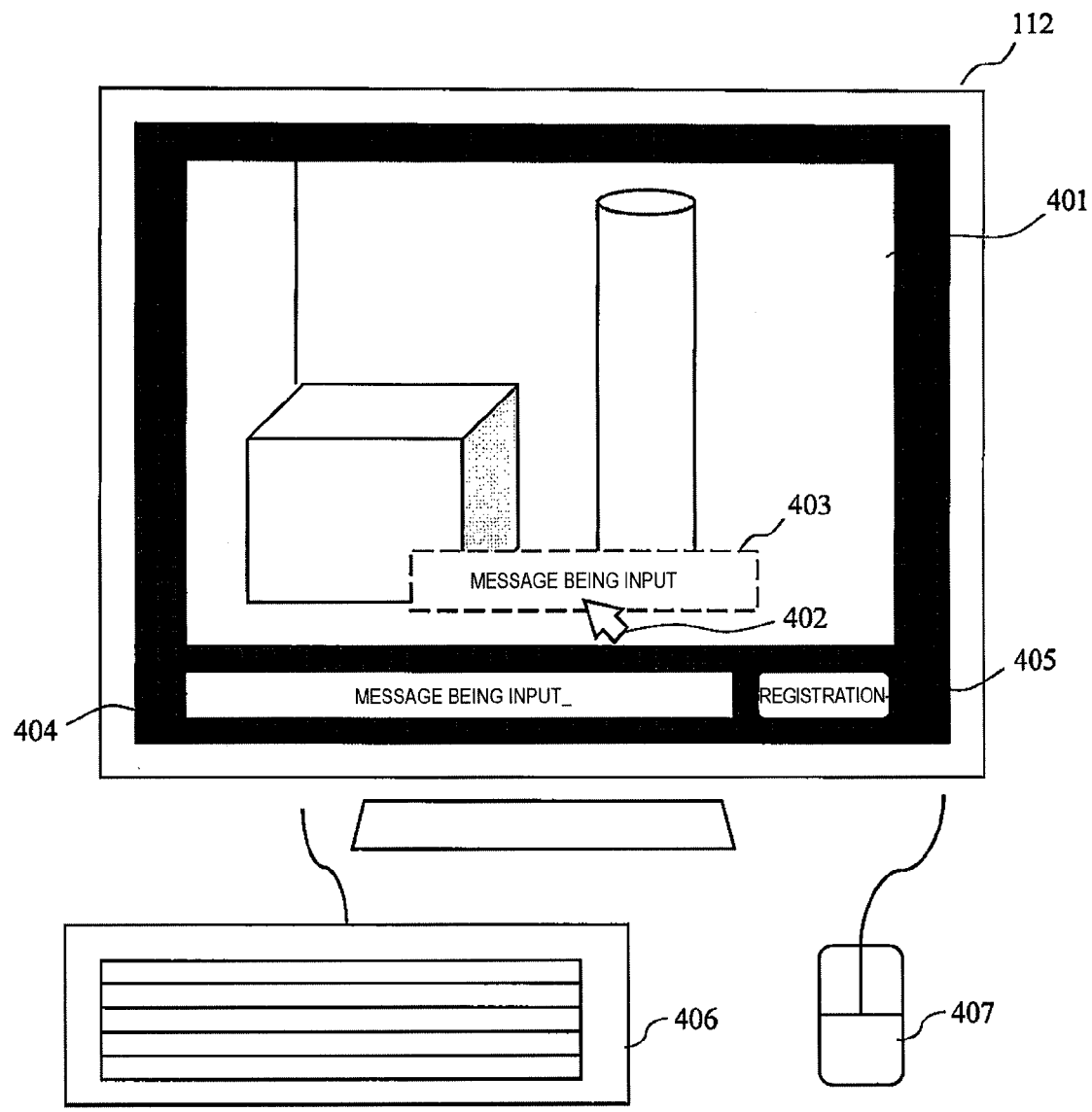
FIG. 4 is a diagram illustrating an exemplary screen in which a user inputs, in a system, a message to be registered in the database 109 by a message registration unit 106.

FIG. 4 is a diagram illustrating an exemplified screen in which a message to be registered in the database 109 by the message registration unit 106 is input to the system by a user. A user uses the display device 112 and the input device 113 in registering a message in the database 109. Herein, a keyboard 406 and a mouse 407 are exemplarily described as the input device 113, but the input device is not limited to them.

A user moves a mouse cursor 402 to an arbitrary position on a monitoring screen 401 and presses a click button. The video control unit 105 draws a message display region 403 in the monitoring screen 401. The user inputs a message desired to be superimposedly displayed in a message box 404 by using the keyboard 406. At this point, a message currently input may be drawn in the screen every time a key of the keyboard 406 is pressed, so that the screen display attained after the input can be checked. When the user has completely input the message, he/she clicks a registration button 405 by operating the mouse 407. As a result, the text message input by the user is sent to the message registration unit 106 through the operation information input unit 111.

Figure 5:
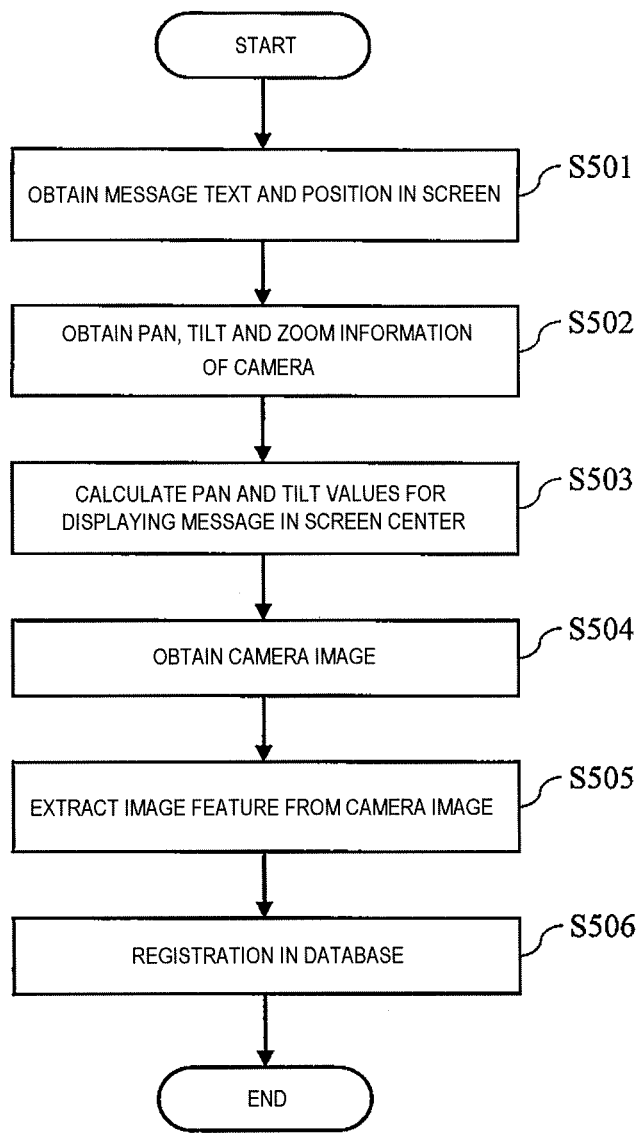
FIG. 5 is a flowchart illustrating processing for registering a message in the database 109 by the message registration unit 106.

FIG. 5 is a flowchart for illustrating processing for registering a message in the database 109 by the message registration unit 106. Respective steps illustrated in FIG. 5 will now be described.

(FIG. 5: Step S501)

The operation information input unit 111 obtains a message input by a user and a position thereof in the screen, and outputs the obtained data to the message registration unit 106.

(FIG. 5: Step S502)

The message registration unit 106 obtains, from the camera information obtaining unit 103, pan, tilt and zoom values of the camera 101.

(FIG. 5: Step S503)

The message registration unit 106 calculates pan and tilt values to be used for displaying the message in the center of a camera image on the basis of the position of the message in the screen obtained in step S501, the pan, tilt and zoom values of the camera obtained in step S502 and the horizontal angle of view and the vertical angle of view of the camera. Specifically, calculation reverse to calculation performed in step S607 of FIG. 6 described later for obtaining a coordinate on a camera image from pan and tilt values may be carried out.

(FIG. 5: Step S504)

The message registration unit 106 obtains a camera image from the camera image obtaining unit 104.

(FIG. 5: Step S505)

The message registration unit 106 outputs the camera image obtained in step S504 to the feature extraction unit 107. The feature extraction unit 107 calculates an image feature.

(FIG. 5: Step S506)

The message registration unit 106 outputs, to the database control unit 108, the message text and the zoom value obtained in step S501, the pan and tilt values obtained in step S502, the camera image obtained in step S504 and the image feature calculated in step S505. The database control unit 108 registers these data in the database 109 in association with one another.

Figure 6:
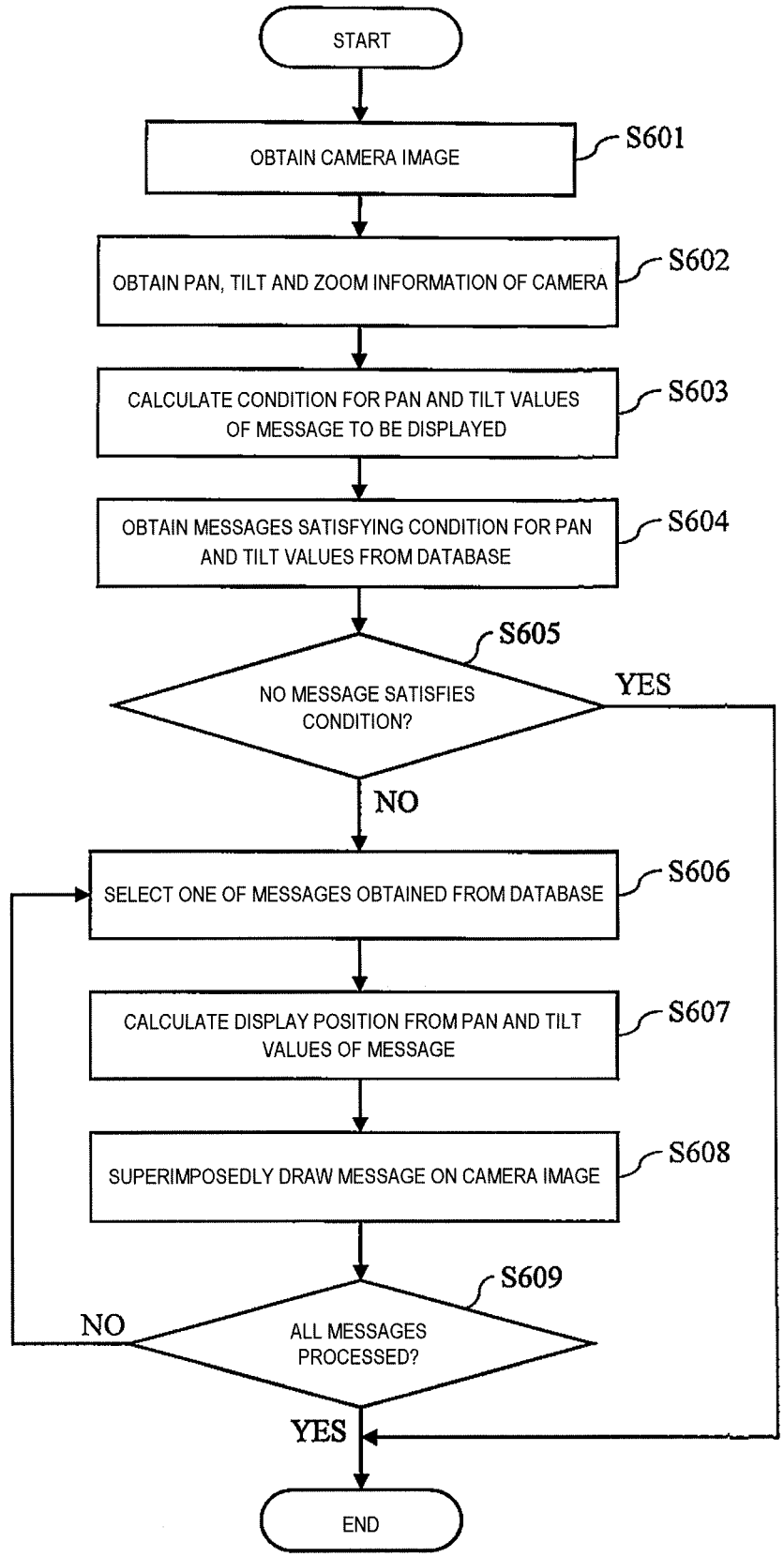
FIG. 6 is a flowchart illustrating an operation of the video control unit 105 to superimposedly display a message on a camera image.

FIG. 6 is a flowchart illustrating an operation for superimposedly displaying a message on a camera image by the video control unit 105. Respective steps illustrated in FIG. 6 will now be described.

(FIG. 6: Step S601)

The video control unit 105 obtains a camera image from the camera image obtaining unit 104.

(FIG. 6: Step S602)

The video control unit 105 obtains pan, tilt and zoom values of the camera 101 from the camera information obtaining unit 104.

(FIG. 6: Step S603)

The video control unit 105 calculates a condition for pan and tilt values of a message to be displayed. The horizontal angle of view and the vertical angle of view of the camera are obtained from the specifications of the camera and the zoom value obtained in step S602. The condition Rp for the pan value is calculated as p−Ah/2 to p+Ah/2 based on the pan value p obtained in step S602 and the horizontal angle of view Ah. The condition Rt for the tilt value is calculated as t−Av/2 to t+Av/2 based on the tilt value t obtained in step S602 and the horizontal angle of view Av.

(FIG. 6: Step S604)

The video control unit 105 obtains, from the database 109, messages satisfying the condition Rp for the pan value and the condition Rt for the tilt value obtained in step S603, and creates a list of the messages.

(FIG. 6: Steps S603 to S604; Supplement)

The video control unit 105 searches not all the messages registered in the database 109 but merely messages falling within a prescribed range. The detail of the search will be described later with reference to FIG. 7.

(FIG. 6: Step S605)

The video control unit 105 terminates this processing flow if there is no message satisfying the conditions. In this case, the camera image obtained in step S601 is directly output to the video output unit 110. If there is any message satisfying the conditions, the processing proceeds to step S606.

(FIG. 6: Step S606)

The video control unit 105 selects one message from the list of messages obtained in step S604.

(FIG. 6: Step S607)

The video control unit 105 calculates a coordinate for displaying a message on a camera image on the basis of a pan value p' and a tilt value t' in association with the message, and a width w and a height h of the camera image. For example, assuming that a coordinate (x, y) in an uppermost leftmost position of a camera image is (0, 0), the coordinate (x, y) for displaying a message can be approximately calculated in accordance with the following expression.

(FIG. 6: Step S607: Expression)

$$x=(p'-(p-Ah/2)/Ah \times w$$

$$y=h-(t'-(t-Av/2))/Av \times h$$

(FIG. 6: Step S608)

The video control unit 105 superimposedly draws the message selected in step S606 on the coordinate calculated in step S607 in the camera image obtained in step S601.

(FIG. 6: Step S609)

If all messages obtained from the database 109 in step S604 have been completely subjected to the superimposed displaying processing, the video control unit 105 terminates this processing flow. If there still remains any messages to be processed, the processing returns to step S606 for processing the remaining message.

The structure and the whole operation of the video monitoring apparatus 100 have been described so far. Next, a method for efficiently searching for a message to be superimposedly displayed from a large number of messages registered in the database 109 will be described.

Every time a user performs an operation for the pan, tilt and zoom of the camera, the video monitoring apparatus 100 should obtain a message to be displayed in the screen from the database 109. If the number of messages registered in the database 109 is increased, processing cost for making determination for the condition for whether or not the superimposed displaying is necessary with respect to all the data is increased, which may interfere with the drawing processing.

Therefore, the video monitoring apparatus 100 precedently executes clustering processing for messages registered in the database 109 in accordance with their pan, tilt and zoom values. In selecting a message to be superimposedly displayed, the determination for the condition is made not with respect to all the messages registered in the database 109 but with respect to merely elements belonging to a cluster having an element average close to the current pan, tilt and zoom values of the camera.

FIG. 7 is a diagram explaining a concept of the clustering processing for messages in accordance with the pan, tilt and zoom values. A message to be superimposed on a monitor image can be made to correspond to an imaging visual field of an image picked up at that time by the camera 101, that is, the pan, tilt and zoom values of the camera 101. Therefore, the database control unit 108 performs the clustering processing for messages to be registered in the database 109 in accordance with triaxial coordinate values of the pan, tilt and zoom.

The clustering processing is a process for grouping messages having close coordinates. The result of the clustering processing is separately registered in the database 109 as clustering information described later with reference to FIG. 8.

On a space expressed by the three axes of the pan, tilt and zoom in FIG. 7, it is assumed that a message is registered in each circled position on the database 109. In the exemplary case of FIG. 7, three clusters are formed respectively in regions 701, 702 and 703.

The database control unit 108 precedently calculates, with respect to each of the clusters, a cluster average value (corresponding to a x mark in FIG. 7) corresponding to an average of elements belonging to the cluster. Furthermore, the video control unit 105 precedently holds a threshold value to be used for determining whether or not the pan, tilt and zoom values of the camera 101 belong to a given cluster. For example, such a threshold value may be stored in an arbitrary region on the database 109. Each dotted line of FIG. 7 indicates a distance from each cluster center within such a threshold value.

In FIG. 7, it is assumed that the pan, tilt and zoom values of the driver device of the camera 101 are on a coordinate 704. A screen display region 705 in the display device 112 corresponding to the coordinate 704 is expressed as a rectangular region having the coordinate 704 in the center. At this point, a distance between the cluster center of the cluster 701 and the coordinate 704 is within the distance of the threshold value indicated by the dotted line.

The video control unit 105 determines whether or not messages belonging to the cluster 701 are fit within the screen display region. Through this determination, the video control unit 105 can efficiently extract messages to be superimposedly displayed in the screen display region 705 without checking all the data registered in the database 109.

FIG. 8 is a diagram illustrating the structure of cluster information and exemplary data. The cluster information is data for holding a result of the clustering processing described with reference to FIG. 7, and includes a cluster ID field 801, a cluster center field 802 and a message ID list field 803.

The cluster ID field 801 holds an identification number of each cluster. The cluster center field 802 holds a vector expressing an average value of pan, tilt and zoom values of each message belonging to a cluster identified by the value of the cluster ID field 801. The message ID list field 803 holds a list of identification numbers of messages belonging to the cluster identified by the value of the cluster ID field 801. The identification number of each message corresponds to the value held in the message ID field 201 of FIG. 2.

The video control unit 105 determines, in steps S603 to S604 of FIG. 6, which cluster an image currently picked up by the camera 101 belongs to. At this point, the pan, tilt and zoom values of the camera 101 are first obtained from the camera information obtaining unit 103, so as to obtain a distance from each coordinate held in the cluster center field 802. If the distance falls within the prescribed range indicated by the dotted line of FIG. 7, the image currently picked up by the camera 101 is determined to belong to that cluster. Next, the video control unit 105 obtains message IDs belonging to the cluster from the message ID list field 803. Each message may be determined for whether or not it is included in the screen display region 705 by calculating an imaging visual field by using parameters such as current pan, tilt and zoom values of the camera 101 and determining whether or not the message can be fit within the imaging visual field.

The method for efficiently searching for messages to be superimposedly displayed by the video monitoring apparatus 100 has been described so far. This method is efficient particularly in the case where there are a plurality of messages registered in the database 109 having distances therebetween in the screen smaller than the size of an image picked up by the camera 101 because messages to be subjected to the determination for the superimposed displaying in the screen can be limited to those belonging to a cluster in such a case. On the other hand, if there is merely one message belonging to each cluster, the effect of this method is substantially the same as that of the conventional method because all messages are to be subjected to the determination for the superimposed displaying in this case.

Embodiment 1

Brief

As described so far, the video monitoring apparatus 100 according to Embodiment 1 searches for messages having a distance from an image currently picked up by the camera 101 falling within a prescribed range, namely, searches for a cluster having a cluster center with a distance from the currently picked up image falling within a prescribed range, on the basis of pan, tilt and zoom values stored in the database 109. Next, out of messages belonging to the cluster, those included in the range of the image currently picked up by the camera 101 are extracted, so as to be superimposedly displayed on the image. Therefore, the number of times of performing the searching processing for messages to be superimposedly displayed depends upon the number of clusters and the number of messages belonging to each cluster. Thus, there is no need to make determination for the superimposed displaying with respect to all the messages, and hence, the load of the searching processing can be reduced.

Embodiment 2

In Embodiment 1, the method for reducing the searching load by performing the clustering processing for messages to be superimposedly displayed is described. On the other hand, in the case where there are a large number of messages to be superimposedly displayed in one screen, if all the messages are superimposed on a monitoring camera image, the monitoring camera image is covered with text information, which harms the visibility of a video to be essentially monitored.

Accordingly, in Embodiment 2, a method in which each message is provided with a degree of priority so as to superimposedly display merely a message with a high degree of priority will be described. Since the structure of a video monitoring apparatus 100 of this embodiment is the same as that described in Embodiment 1, differences from Embodiment 1 will be mainly described below.

Figure 9:
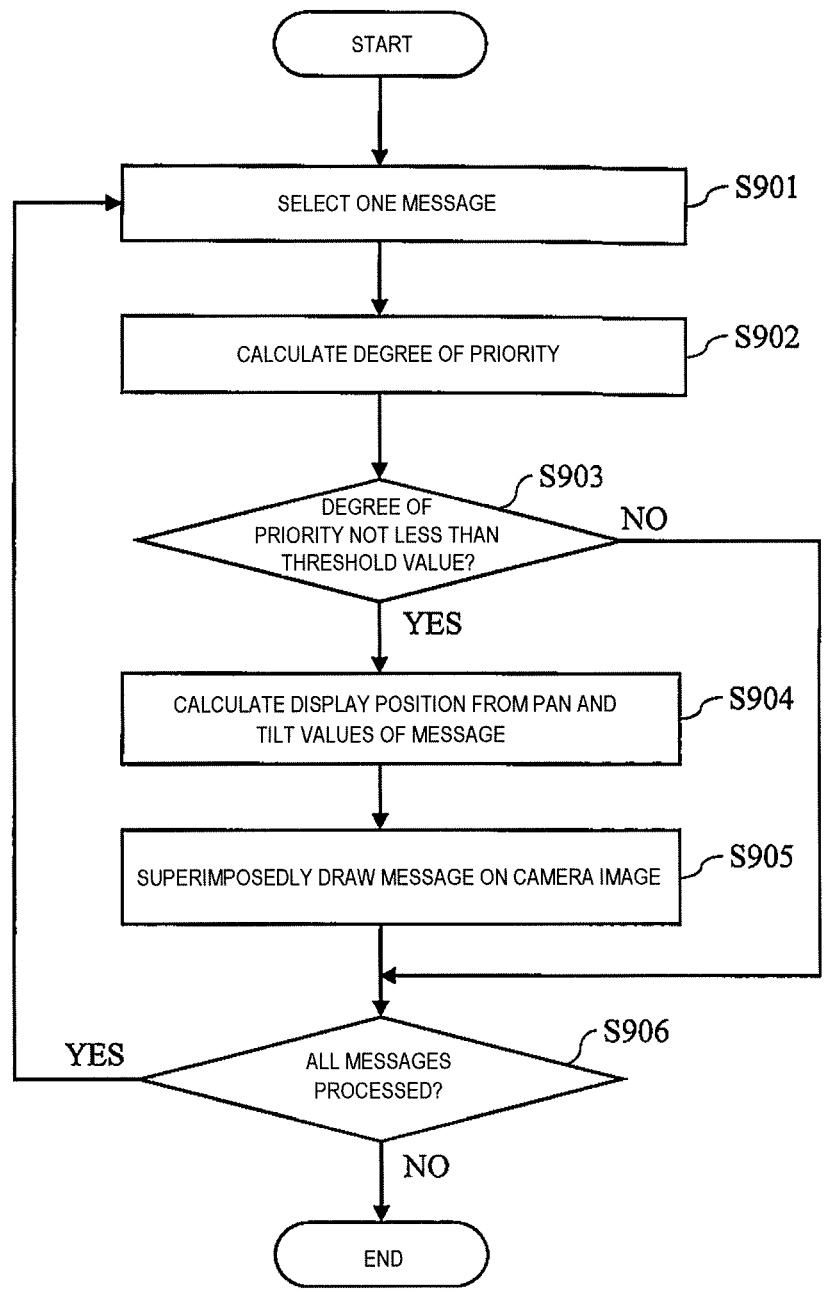
FIG. 9 is a flowchart illustrating processing for limiting messages to be superimposed on a monitor image by the video monitoring apparatus 100.

FIG. 9 is a flowchart illustrating processing for limiting messages to be superimposedly displayed on a monitor image by the video monitoring apparatus 100. The processing of FIG. 9 is executed for limiting messages to be superimposedly drawn in steps S606 to S609 of FIG. 6. Respective steps of FIG. 9 will now be described.

(FIG. 9: Step S901)

This step is the same as step S606.

(FIG. 9: Step S902)

The video control unit 105 calculates a degree of priority of a message selected in step S901. Examples of a calculation method for the degree of priority include the following.

(FIG. 9: Step S902: Calculation Example 1)

As a distance of a message from an image currently picked up by the camera 101 is smaller, the message is provided with a higher degree of priority. A distance between an image and a message can be calculated by using, for example, current pan, tilt and zoom values of the camera 101 and pan, tilt and zoom values in association with the message.
(FIG. 9: Step S902: Calculation Example 2)

As the date and time of registration of a message in the database 109 are later, the message is provided with a higher degree of priority.
(FIG. 9: Step S902: Calculation Example 3)

As an image currently picked up by the camera 101 is more similar to an image held in the camera image field 207 in association with a message, the message is provided with a higher degree of priority.
(FIG. 9: Step S903)

If the degree of priority calculated in step S902 is not less than a prescribed threshold value, the processing proceeds to step S904, and if not, the processing skips to step S906.
(FIG. 9: Steps S904 to S906)

These steps are the same as steps S606 to S608 of FIG. 6.

Figure 10:
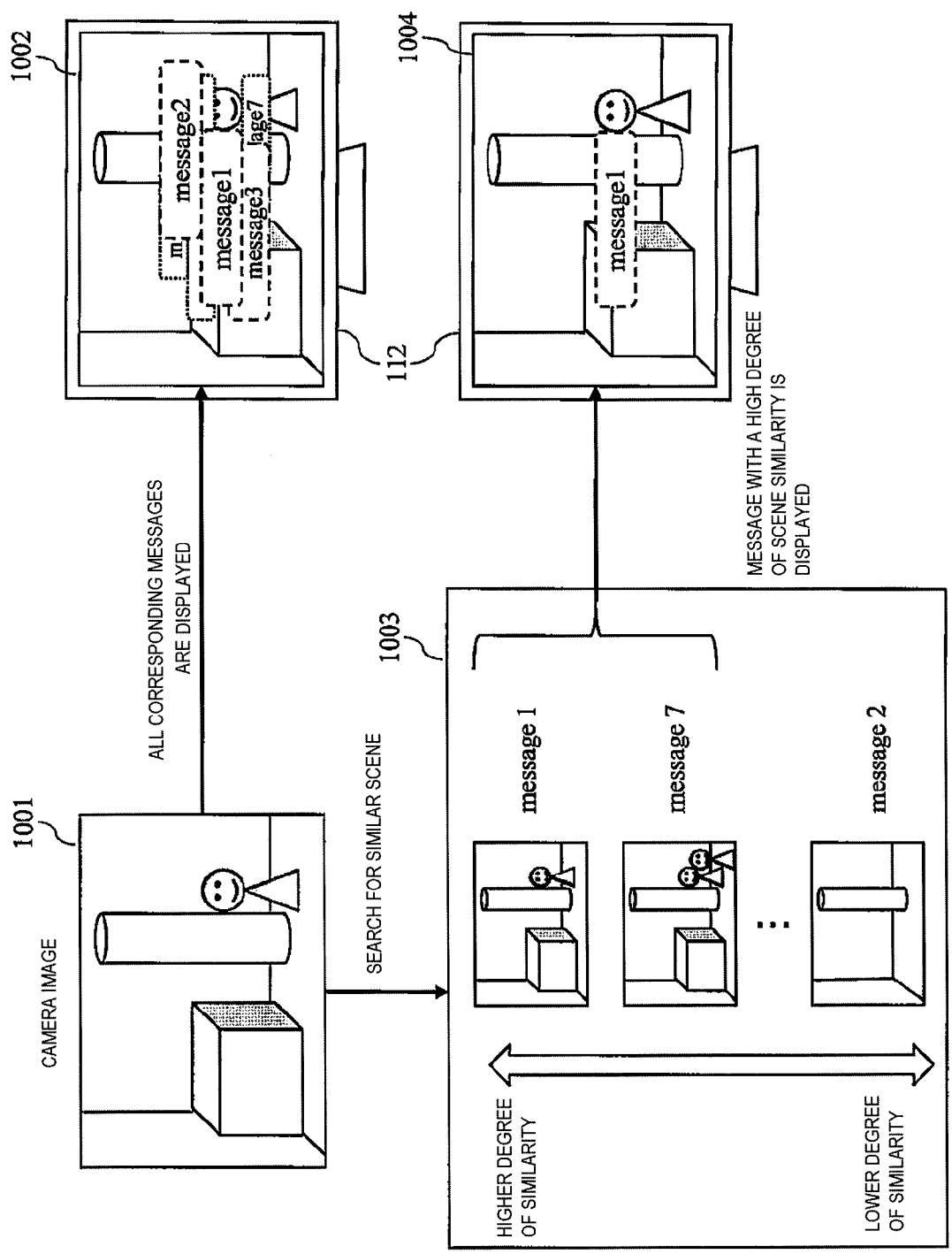
FIG. 10 is a diagram illustrating a state where messages to be superimposedly displayed are limited by providing a high degree of priority to messages corresponding to similar images.

FIG. 10 is a diagram illustrating a state where messages to be superimposedly displayed are limited by providing a higher degree of priority to a message in association with a similar image. The method illustrated in FIG. 10 corresponds to a case where Calculation example 3 is employed in step S902.

If messages are not limited, the video control unit 105 reads messages that may be fit within the angle of view of a camera image 1001 from the database 109 and superimposedly draws these messages. As a result, a monitoring screen 1002 is displayed in the display device 112.

In this case, if a large number of corresponding messages are registered in the database 109, the displayed messages overlap each other as exemplarily illustrated as in the monitoring screen 1002 of FIG. 10, and thus, the visibility of the camera image itself is degraded.

Therefore, the video control unit 105 searches for an image similar to the current camera image 1001 in the camera image field 207 of the database 109. The video control unit 105 sorts images held in the camera image field 207 in the ascending order of a distance between image feature vectors (feature distance). A search result 1003 of FIG. 10 is obtained in the form of a list in which images are arranged in the ascending order of the feature distance (=the descending order of the degree of similarity).

As the degree of similarity of an image held in the camera image field 207 is higher, a higher degree of priority is provided to a corresponding message because as the degree of similarity of an image of this field is higher, the corresponding message can be regarded probably to have been registered in a situation similar to the current camera image.

The video control unit 105 provides a degree of priority to each message involved in the search result 1003 in accordance with criteria that the degree of priority is higher as the degree of similarity is higher, or the like, and superimposedly draws a message having a degree of priority not less than a prescribed threshold value on the camera image. In this manner, as exemplarily illustrated in a monitoring screen 1004, the visibility of the monitor image can be maintained.

Embodiment 2

Brief

As described so far, the video monitoring apparatus 100 according to Embodiment 2 searches for messages to be superimposed in the database 109, calculates the degrees of priority of the respective messages, and then, superimposes merely a message having a high degree of priority on an image. Therefore, the visibility of a monitor image can be prevented from being degraded by superimposedly displaying a large number of messages simultaneously.

Embodiment 3

In Embodiment 2, the method in which images similar to an image currently picked up by the camera 101 are searched for in the camera image field 207 so as to priorly select those with a high degree of similarity is described. In this case, the degree of similarity is calculated depending upon whether or not an image is similar as a whole. Therefore, if a message display position is set in an end portion of the screen, the degree of similarity between images is inevitably low, and hence, such a message is liable to be not selected.

Therefore, in Embodiment 3, images similar to partial images of an image picked up by the camera 101 are searched for in the camera image field 207, so that a message having a display position set in an end portion of the screen may be also selected by appropriately calculating a degree of similarity in accordance with the position in the screen.

Figure 11:
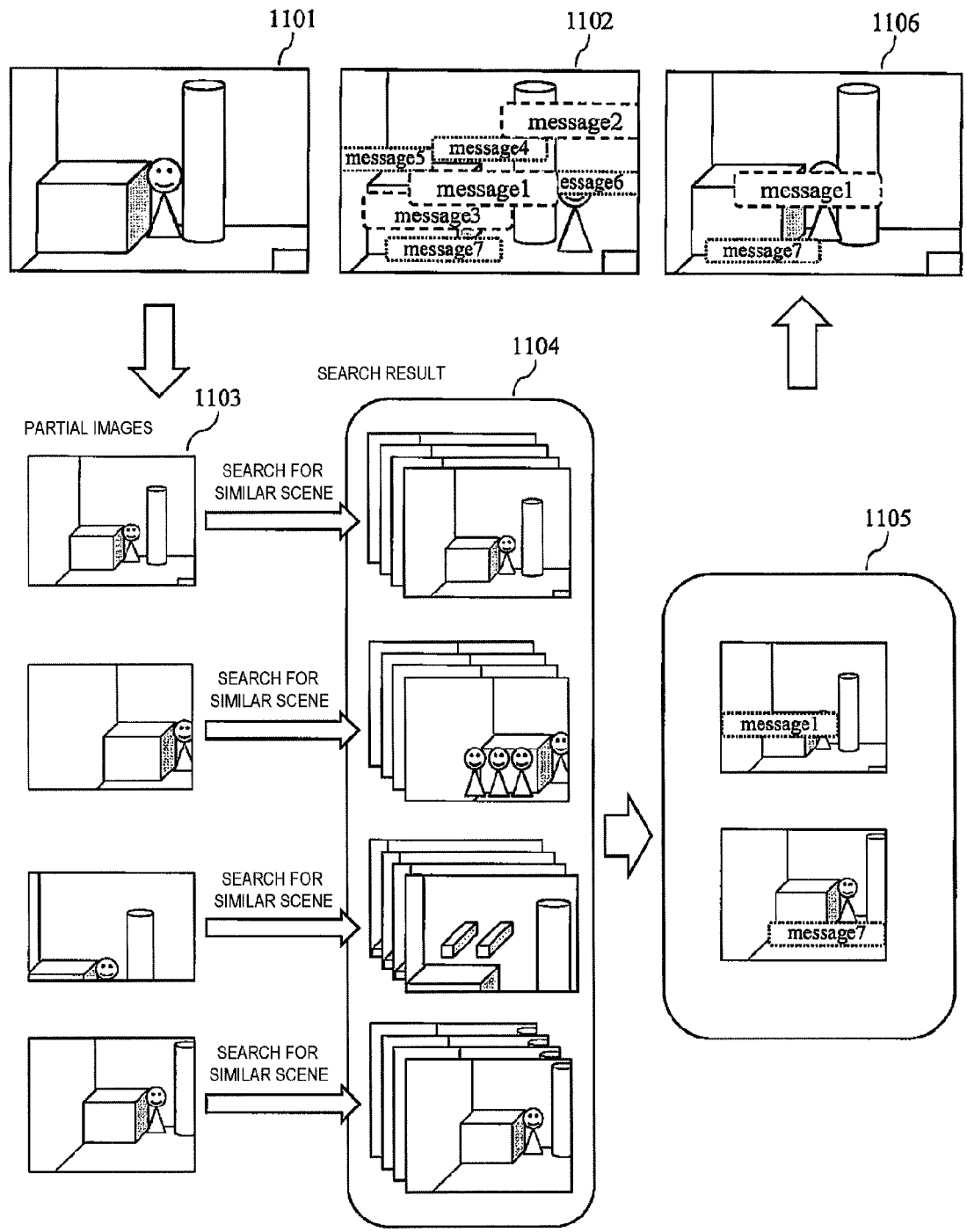
FIG. 11 is a diagram illustrating a state where images similar to partial images of an image picked up by a camera 101 are searched for in a camera image field 207.

FIG. 11 is a diagram illustrating a state where images similar to partial images of an image picked up by the camera 101 are searched for in the camera image field 207.

In FIG. 11, a large number of messages are made to correspond to a camera image 1101, and therefore, if messages to be superimposedly displayed are not limited, too many messages are superimposed as in a monitoring screen 1102, resulting in degrading the visibility of a monitor image.

Therefore, the video control unit 105 generates partial images 1103 with respect to a plurality of portions of the camera image 1101, and images similar to these partial images are searched for in the camera image field 207. The video control unit 105 sorts images obtained as a search result 1104 in the order of the degree of similarity, and images having a degree of similarity not less than a prescribed threshold value are extracted from the camera image field 207. The video control unit 105 superimposedly draws merely messages in association with the images obtained as an extraction result 1105 on the camera image, so as to create a monitoring screen 1106.

Figure 12:
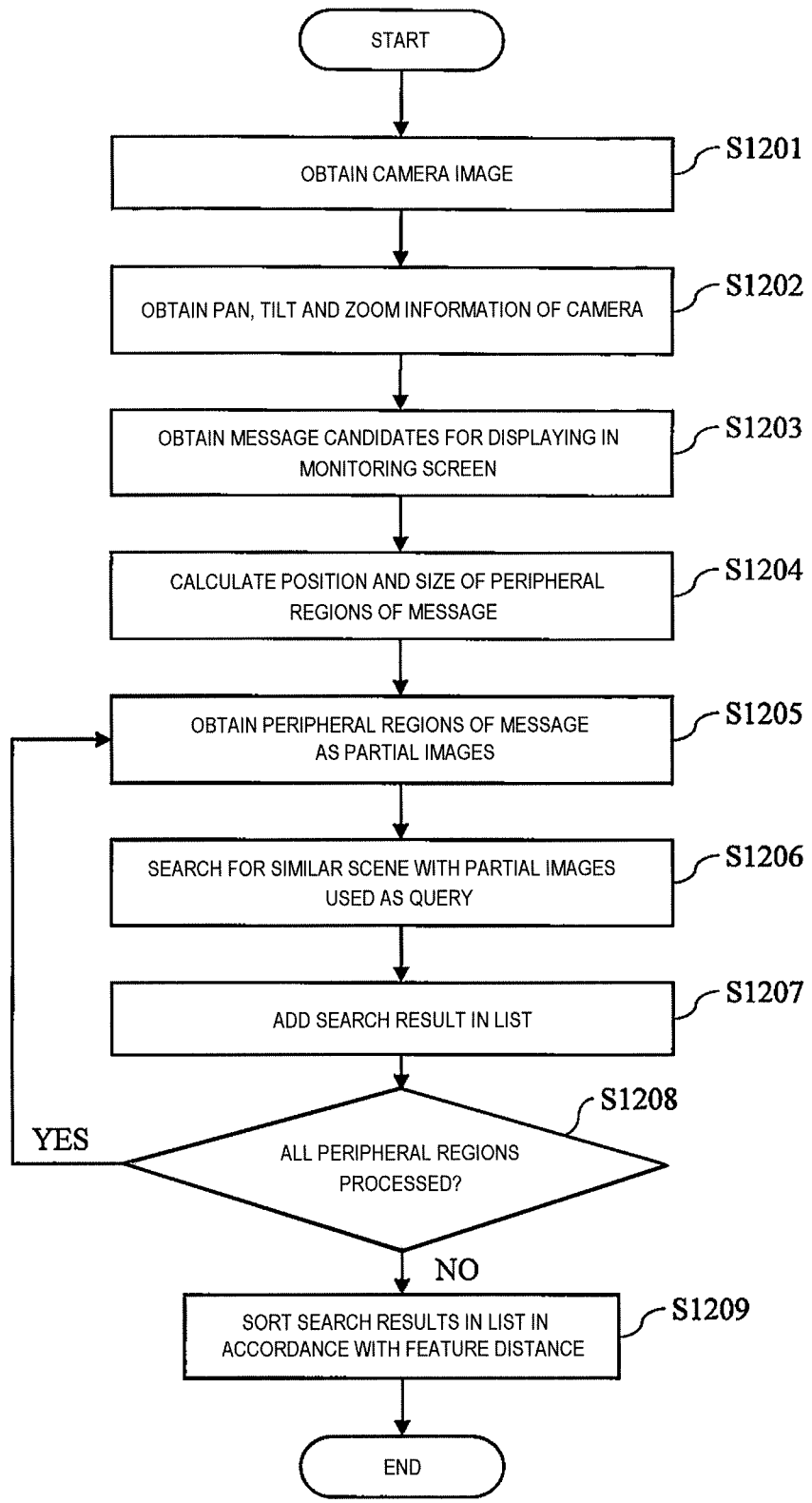
FIG. 12 is a flowchart illustrating a processing flow for searching for images similar to partial images of an image picked up by the camera 101 in the camera image field 207.

FIG. 12 illustrates a processing flow for searching for images similar to partial images of an image picked up by the camera 101 in the camera image field 207. The processing flow of FIG. 12 describes the details of the method described with reference to FIG. 11. Respective steps illustrated in FIG. 12 will now be described.
(FIG. 12: Steps S1201 to S1203)

These steps are the same as steps S601 to S604 of FIG. 6.
(FIG. 12: Step S1204)

The video control unit 105 calculates the position and the size of a peripheral region of each message on the basis of the pan, tilt and zoom values in association with message candidates obtained in step S1203. This peripheral region is used as a partial image described with reference to FIG. 11 in the following step S1205.
(FIG. 12: Step S1204: Supplement)

In this step, partial images overlapping each other may be appropriately excluded. Furthermore, if the clustering processing as described in Embodiment 1 is performed by using the pan, tilt and zoom values of the message candidates so as to merely use the center values of respective clusters, the number of partial images may be reduced. Specifically, merely a partial image the closest to the center value of each cluster may be compared with images stored in the camera image field 207 of the database 109.

(FIG. 12: Step S1205)

The video control unit 105 selects one of the peripheral regions obtained in step S1204, so as to obtain it as a partial image.

(FIG. 12: Step S1206)

The video control unit 105 searches for images similar to the partial image in the camera image field 207.

(FIG. 12: Step S1207)

The video control unit 105 adds a search result to a list. In the list, a message ID and a feature distance (a degree of similarity) are registered as a set.

(FIG. 12: Step S1208)

The processing proceeds to step S1209 if all the peripheral regions have been processed, and if there remains any peripheral regions not processed, the processing returns to step S1205 so that the video control unit 105 may repeat similar processing.

(FIG. 12: Step S1209)

The video control unit 105 sorts images in the list obtained as the search result in the order of a feature distance (a degree of similarity). Besides, if one message ID is repeatedly selected, merely a message having the smallest feature distance (namely, the highest degree of similarity) is kept in the list. As a result, a list of message IDs sorted in the ascending order of the feature distance (in the descending order of the degree of similarity) is obtained. The video control unit 105 can take the messages held in this list as candidates to be superimposedly displayed.

Embodiment 3

Brief

As described so far, the video monitoring apparatus 100 of Embodiment 3 searches for images similar to partial images of an image picked up by the camera 101 in the camera image field 207, and provides a higher degree of priority to a message corresponding to an image with a higher degree of similarity held in the camera image field 207. Therefore, even if the display position of a message is set in an end portion of a screen, when its peripheral image is similar to the camera image, the message is determined to have a high degree of similarity. Accordingly, even a message to be displayed in an end portion of a screen can be appropriately determined for the degree of similarity, so as to be selected as an object to be superimposedly displayed.

Embodiment 4

In Embodiments 2 and 3, the description is made on the calculation of the degree of similarity between images by associating the pan, tilt and zoom values of the camera 101 with images held in the camera image field 207 and by using features of the images held in the camera image field 207. When the pan, tilt and zoom values of the camera 101 are changed, if a specific image feature alone is largely changed but the other image features are not much changed, the specific image feature largely changed alone may be used for calculating a degree of similarity.

Therefore, in Embodiment 4, a method in which the degree of similarity between images is calculated by using merely a part of image features in accordance with the current pan, tilt and zoom values of the camera 101 will be described.

FIG. 13 is a diagram illustrating image feature information 1301 stored in a database 109 of Embodiment 4 and a state where a degree of similarity between images is calculated by using this information. In Embodiment 4, the database 109 stores the image feature information 1301 in addition to the respective data described with reference to FIG. 2. In the exemplary case illustrated in FIG. 13, color features are held in a first portion 1302 of the image feature information 1301, and shape features are held in a second portion 1303.

In a monitored space 1304, structural change is minimally caused in an upper portion 1305, and hence, a difference in luminosity of a light or the like has a significant meaning in searching for a similar scene of this portion. Therefore, if the camera 101 has a tilt value corresponding to the screen upper portion 1305, the video control unit 105 uses merely the first portion 1302 corresponding to color features in calculating feature distances.

On the other hand, in a lower portion 1306 of the monitored space 1304, not the change in luminosity but a shape feature corresponding to the presence of a human, a machine or a material largely affects the calculation of a degree of similarity. Therefore, if the camera 101 has a tilt value corresponding to the screen lower portion 1306, the video control unit 105 uses merely the second portion 1303 corresponding to shape features in the calculation of feature distances.

Such a relationship between an imaging visual field of the camera 101 and an image feature is precedently determined in accordance with the installation position of the camera 101. It may be preset in the video monitoring apparatus 100 or may be specified by a user in a monitoring screen displayed in the display device 112 which image feature is to be used for the calculation of a degree of similarity in accordance with which ranges the pan, tilt and zoom values of the camera 101 fall within.

Embodiment 4

Brief

As described so far, the video monitoring apparatus 100 of Embodiment 4 changes parameters to be used for calculating a degree of image similarity in accordance with an imaging visual field currently picked up by the camera 101. Therefore, a parameter appropriate for the characteristic of a camera image can be selected, so as to efficiently calculate a degree of image similarity.

Embodiment 5

In Embodiments 1 to 4 described above, there may be a case where a user pays attention to the content of a message displayed in the display device 112 together with a monitor image by the video monitoring apparatus 100 and desires to observe a region around the message. In Embodiment 5, an exemplary operation for moving an imaging visual field of the camera 101 by a user selecting a message will be described.

Figure 14:
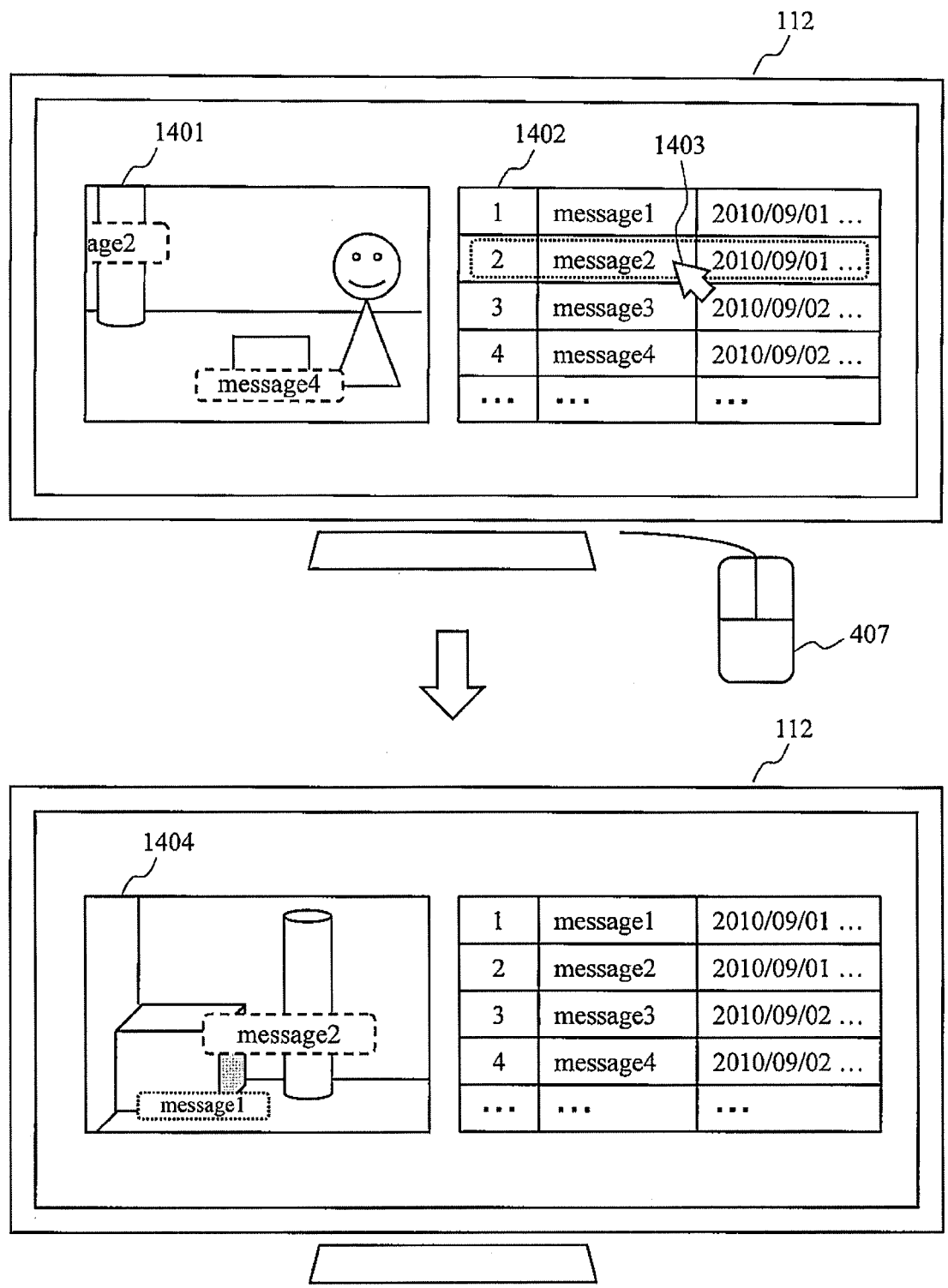
FIG. 14 is a diagram illustrating a state where an imaging visual field of the camera 101 is controlled by a user selecting a message.

FIG. 14 is a diagram illustrating a state where an imaging visual field of the camera 101 is controlled by a user selecting a message. In FIG. 14, a monitoring screen 1401 and a registered message list 1402 are displayed side by side in the display device 112.

A user operates a mouse cursor 1403 by using the mouse 407 so as to click one of messages in the message list. The video control unit 105 receives this operation instruction, and controls an imaging visual field of the camera 101 so that the imaging visual field may accord with the pan, tilt and zoom values in association with the clicked message. In this manner, the clicked message is displayed in the center of the screen as illustrated in a monitoring screen 1404.

Although the camera 101 is controlled by using the pan, tilt and zoom values in association with a message in FIG. 14, the camera 101 may be controlled by employing, for example, the clustering processing in accordance with the pan, tilt and zoom values described with reference to FIG. 7, so that the imaging visual field may accord with the center value of a cluster to which the selected message belongs. In this manner, not only the selected message but also messages around it may be displayed in the screen.

Furthermore, the video control unit 105 may display messages belonging to a cluster sorted in accordance with the pan, tilt and zoom values thereof in displaying the messages in the registered message list 1402. Thus, messages close to one another may be displayed in the screen in proper order, which is convenient for a user.

Besides, the number of messages to be selected by a user is not limited to one. If a user selects a plurality of messages, the video control unit 105 may control the camera 101 so that these selected messages can be disposed within one screen if possible.

Embodiment 6

In Embodiments 1 to 5 described above, a position for superimposedly displaying a message is in correspondence with image specifying information for specifying an image picked up by the camera 101, such as the pan, tilt and zoom values of the camera 101. If a small positional shift is caused due to change in the surrounding environment such as vibration or due to degradation of the driver device of the camera, however, there is possibility that the display position for a message may become inaccurate.

Therefore, in Embodiment 6, pan, tilt and zoom values are corrected by using the pan, tilt and zoom values registered in the database 109 and an image or an image feature.

Figure 15:
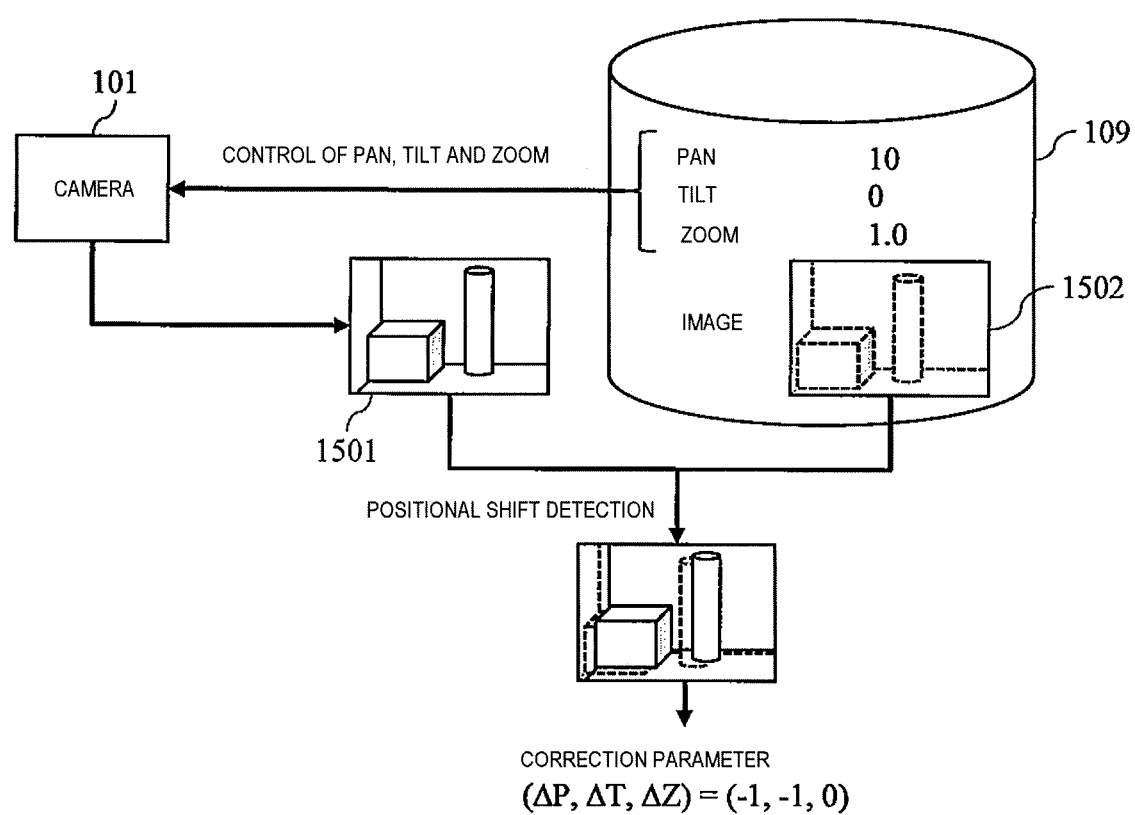
FIG. 15 is a diagram illustrating processing for correcting the pan, tilt and zoom values of the camera 101 by the video monitoring apparatus 100.

FIG. 15 is a diagram illustrating processing for correcting the pan, tilt and zoom values of the camera 101 by the video monitoring apparatus 100. The procedures for the correction will now be described.

(Correction procedure 1) The video control unit 105 selects one arbitrary data from the database 109 and obtains the pan, tilt and zoom values.

(Correction procedure 2) The video control unit 105 controls the camera 101 in accordance with the obtained pan, tilt and zoom values.

(Correction procedure 3) The video control unit 105 obtains a camera image 1501 from the camera 101.

(Correction procedure 4) The video control unit 105 executes matching between the obtained camera image 1501 and a corresponding image (a camera image 1502) held in the camera image field 207 of the database 109, so as to estimate a positional shift.

(Correction procedure 5) The video control unit 105 converts the positional shift in the image thus obtained into a shift in the pan and tilt values, so as to obtain a correction parameter.

(Correction procedure 6) After this, in registering a message in the database 109, the database control unit 108 registers it after subtracting the correction parameter therefrom, and in superimposing a message on a camera image, the database control unit 108 calculates the display position after adding the correction parameter. In this manner, a message can be displayed in a corrected accurate position.

The invention achieved by the present inventor has been specifically described with reference to the embodiments, and needless to say, the present invention is not limited to the embodiments described above and may be variously modified and changed within the scope of the invention.

Furthermore, all or apart of the structures, functions, processing units and the like described above may be realized as hardware by, for example, designing them with integrated circuits, or may be realized as software by executing programs for realizing the functions by a processor. The programs for realizing the respective functions and the information of tables and the like may be stored in a storage device such as a memory or a hard disc, or a recording medium such as an IC card or a DVD.

REFERENCE SIGN LIST

100: video monitoring apparatus, 101: camera, 102: camera control unit, 103: camera information obtaining unit, 104: camera image obtaining unit, 105: video control unit, 106: message registration unit, 107: feature extraction unit, 108: database control unit, 109: database, 110: video output unit, 111: operation information input unit, 112: display device, 113: input device, 201: message ID field, 202: message field, 203: time field, 204: pan field, 205: tilt field, 206: zoom field, 207: camera image field, 208: image feature field, 801: cluster ID field, 802: cluster center field, 803: message ID list field.

The invention claimed is:

1. A video monitoring apparatus comprising:
a camera picking up an image;
a video control unit generating an image in which additional information is superimposed on an image picked up by the camera;
an image output unit outputting the image generated by the video control unit; and
a database for storing a record for associating image specifying information for specifying an image picked up by the camera with the additional information,
wherein the database stores a plurality of records in which a distance between images specified by image specifying information is smaller than a size of an image picked up by the camera, and
the video control unit conducts:
searching of the image specifying information in the database for one or more image specifying information each of which specifies an image having a distance from an image currently picked up by the camera falling within a prescribed range;
extraction, from the one or more image specifying information obtained as a result of the searching, of image specifying information each specifying an image fit within the image currently picked up by the camera; and
superimposing additional information corresponding to the extracted image specifying information on the image picked up by the camera.

2. The video monitoring apparatus according to claim 1, wherein the video control unit calculates a degree of priority of the additional information corresponding to the extracted image specifying information, and superimposes merely additional information having a degree of priority not less than a prescribed threshold value on the image picked up by the camera.

3. The video monitoring apparatus according to claim 2, wherein the video control unit provides a higher degree of priority to image specifying information, out of the extracted image specifying information, that specifies an image having a smaller distance from the image currently picked up by the camera.

4. The video monitoring apparatus according to claim 2, wherein the video control unit provides a higher degree of priority to additional information that is stored in the database later in time and date.

5. The video monitoring apparatus according to claim 2, wherein the database stores images picked up by the camera in association with the image specifying information, and the video control unit searches for images similar to an image picked up by the camera in the database and provides a higher degree of priority to additional information corresponding to an image having a higher degree of similarity.

6. The video monitoring apparatus according to claim 5, wherein the video control unit changes a parameter to be used for calculating a degree of similarity in accordance with an imaging visual field of the image currently picked up by the camera.

7. The video monitoring apparatus according to claim 2, wherein the database stores images picked up by the camera in association with the image specifying information, and the video control unit searches for an image similar to partial images each generated by taking out a part of an image picked up by the camera from the images stored in the database, and provides a higher degree of priority to additional information corresponding to an image having a higher degree of similarity.

8. The video monitoring apparatus according to claim 7, further comprising a database control unit storing the record in the database, wherein the database control unit stores, in the database, parameters characterizing an imaging visual field of the camera as the image specifying information, and performs clustering processing for the parameters for obtaining a cluster of images disposed within a prescribed range out of the images specified by the parameters, and the video control unit subjects, out of the partial images, merely a partial image the closest to a center of the cluster to determination for a degree of similarity to the images stored in the database.

9. The video monitoring apparatus according to claim 1, further comprising a database control unit storing the record in the database, wherein the database control unit stores, in the database, parameters characterizing an imaging visual field of the camera as the image specifying information, and performs clustering processing for the parameters for obtaining a cluster of images disposed within a prescribed range out of the images specified by the parameters.

10. The video monitoring apparatus according to claim 1, further comprising:

a database control unit storing the record in the database; and an operation input unit accepting an operation for the image output by the image output unit, wherein the database control unit stores parameters characterizing an imaging visual field of the camera as the image specifying information, and when the operation input unit receives an instruction operation for positioning the additional information superimposed on the image output by the image output unit in a screen center region, the video control unit specifies an imaging visual field of the camera for positioning the additional information in the screen center region by using a parameter corresponding to the additional information, and controls the camera to pick up the specified imaging visual field.

11. The video monitoring apparatus according to claim 10, wherein the database control unit performs clustering processing for the parameters for obtaining a cluster of images disposed within a prescribed range out of the images specified by the parameters, and when the operation input unit receives an instruction operation for positioning the additional information superimposed on the image output by the image output unit in a screen center region, the video control unit controls the camera so that a center of the cluster to which the additional information belongs may accord with a screen center.

12. The video monitoring apparatus according to claim 11, wherein the video control unit sorts the additional information belonging to the cluster in accordance with values of the parameters, and outputs a list of the sorted additional information together with the image from the image output unit.

13. The video monitoring apparatus according to claim 1, wherein the database stores images picked up by the camera in association with the image specifying information, and the video control unit instructs the camera to pick up an image specified by the image specifying information, obtains a difference between an image currently picked up by the camera and an image correspondingly stored in the database by comparing the images, and corrects a display position by using the difference in superimposing the additional information.

* * * * *

UNITED STATES PATENT AND TRADEMARK OFFICE
CERTIFICATE OF CORRECTION

PATENT NO. : 9,083,891 B2  
APPLICATION NO. : 13/882673  
DATED : July 14, 2015  
INVENTOR(S) : Yuki Watanabe et al.

Page 1 of 1

It is certified that error appears in the above-identified patent and that said Letters Patent is hereby corrected as shown below:

Title Page, below Item (65) insert

-- (30)      Foreign Application Priority Data

Dec. 15, 2010      (JP)............................................2010-279537--

Signed and Sealed this  
Fourteenth Day of June, 2016

Michelle K. Lee  
*Director of the United States Patent and Trademark Office*